United States Patent
Sutto

(10) Patent No.: US 10,923,718 B2
(45) Date of Patent: *Feb. 16, 2021

(54) CONCENTRATED METAL SALT SOLUTION IN A NON-AQUEOUS SOLVENT SYSTEM

(71) Applicant: The Government of the United States of America, as represented by the Secretary of the Navy, Arlington, VA (US)

(72) Inventor: Thomas E. Sutto, Woodbridge, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/520,133

(22) Filed: Jul. 23, 2019

(65) Prior Publication Data
US 2019/0348673 A1    Nov. 14, 2019

Related U.S. Application Data

(63) Continuation of application No. 15/645,906, filed on Jul. 10, 2017, now Pat. No. 10,468,675.
(60) Provisional application No. 62/381,471, filed on Aug. 30, 2016.

(51) Int. Cl.
| | | |
|---|---|---|
| *H01M 4/48* | (2010.01) |
| *H01M 4/90* | (2006.01) |
| *C09D 11/00* | (2014.01) |
| *H01M 8/18* | (2006.01) |

(52) U.S. Cl.
CPC ............. *H01M 4/483* (2013.01); *C09D 11/00* (2013.01); *H01M 4/9016* (2013.01); *H01M 8/188* (2013.01)

(58) Field of Classification Search
CPC ...... H01M 4/483; H01M 4/9016; Y02P 70/50
USPC ......................................................... 423/122
See application file for complete search history.

(56) References Cited

U.S. PATENT DOCUMENTS 10,468,675 B2 * 11/2019 Sutto ................... H01M 4/9016

* cited by examiner

*Primary Examiner* — Khanh T Nguyen
(74) *Attorney, Agent, or Firm* — US Naval Research Laboratory; Stephen T. Hunnius

(57) ABSTRACT

A concentrated solution of a metal salt in a non-aqueous solvent system. A product of the process of making a concentrated solution of a metal salt in a non-aqueous solvent system.

5 Claims, 6 Drawing Sheets

Phosphonium

Ammonium

Pyridinium

Imidazolium triazolium

CONCENTRATED METAL SALT SOLUTION IN A NON-AQUEOUS SOLVENT SYSTEM

REFERENCE TO RELATED APPLICATION

This application is a non-provisional of, and claims priority to and the benefits of, U.S. Patent Application No. 62/381,471 filed on Aug. 30, 2016, and U.S. patent application Ser. No. 15/645,906 filed on Jul. 10, 2017, the entirety of each which is hereby incorporated by reference.

BACKGROUND

This disclosure concerns a new method for creating highly concentrated solutions of vanadium or other metal salts in non-aqueous solutions such as ethylene glycol, poly-ethylene glycols or ionic liquids.

Previous methods for creating solutions of vanadium salts, or other metal salts of low solubility in non-aqueous solvents such as ethylene glycol, poly ethylene glycols or ionic liquids are very limited.

Previous methods often result in concentrations of these metal salts in the low molarity range of less than 0.1 M.

Here, the concentrated solutions invented can then be used for multiple purposes, such as creating inks of metal salts, or even special types of batteries such as the infinitely rechargeable vanadium oxide battery.

SUMMARY OF DISCLOSURE

Description

A method of making highly concentrated solutions of metal salt in non-aqueous solutions.

DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings.

DETAILED DESCRIPTION OF THE INVENTION

A method of making highly concentrated solutions of vanadium or other metal salts in non-aqueous solutions such as ethylene glycol, poly-ethylene glycols or ionic liquids.

Example 1

The general description of this disclosure is to first dissolve the metal salts, such as vanadium (IV) oxysulfate in a water solution. To this water solution, the corresponding non-aqueous solvent such as ethylene glycol, poly ethylene glycols, or an ionic liquid is then added.

Example 2

As an example, one could take a 100 mL solution of vanadium (IV) oxysulfate that has a concentration of 0.05 moles of the metal salt. 10 mL of ethylene glycol could then be added.

The solution is then heated under flowing oxygen to assist in the evaporation of the water component.

After 24 hours of heating, the water component being volatile, will be mostly gone, leaving behind the 0.5 moles of vanadium (IV) oxysulfate in only 10 mL of ethylene glycol, which would then have a concentration of the metal salt of 5 M, which is two orders of magnitude higher than other methods for creating concentrated metal salt solutions.

Other types of glycols such as propylene or any other diol type solvent system can be used.

Example 3

This same approach has demonstrated that it can also be used to create concentrated metal salt solutions in hydrophilic ionic liquids.

Figure 1:
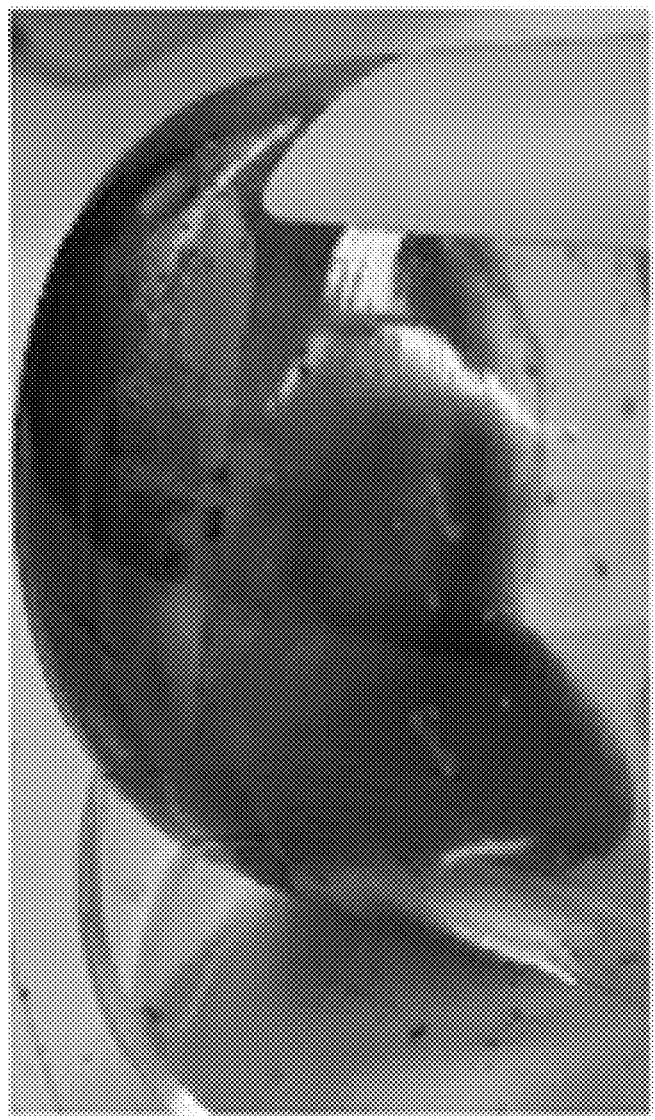
FIG. 1 illustrates a 5 molar solution of vanadium (IV) oxysulfate in ethylene glycol. Because of the bright color of vanadium (IV), a UV-VIS analysis shows the lack of absorption in ethylene glycol.
Figure 2:
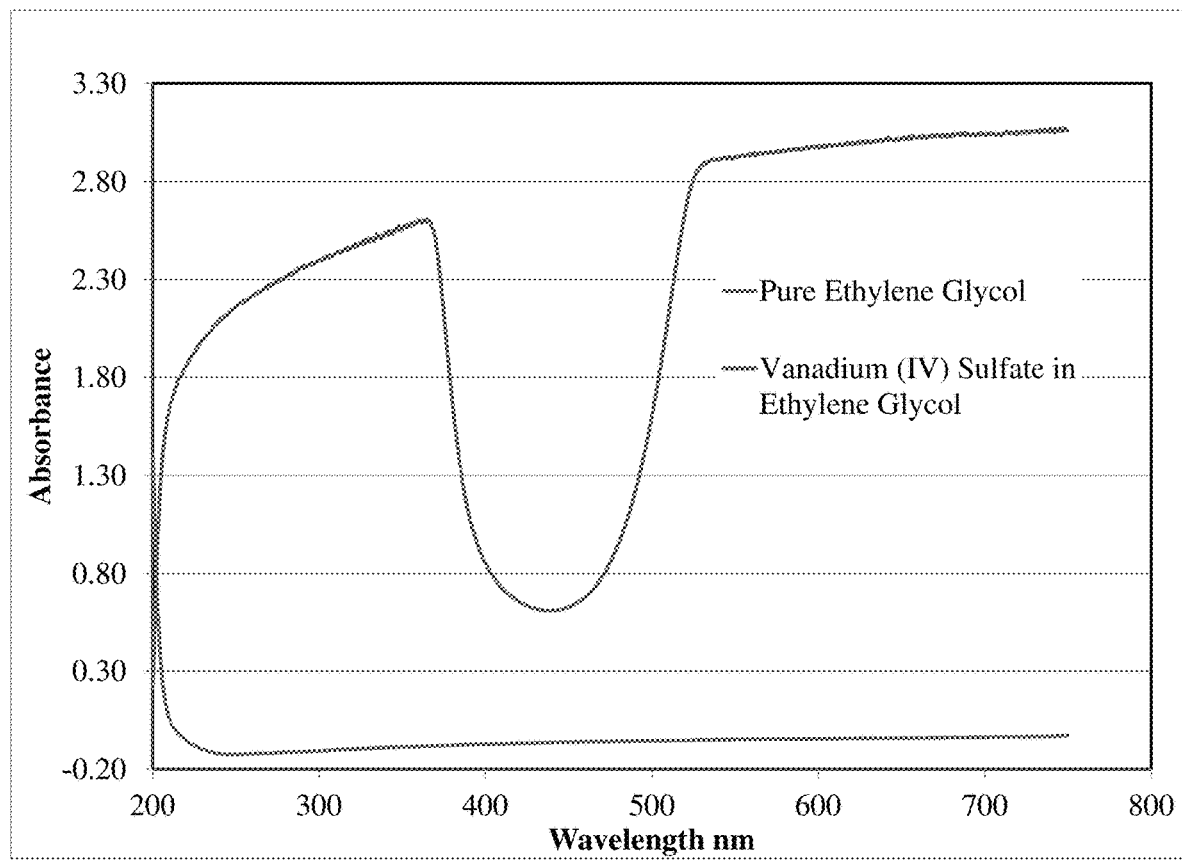
FIG. 2 illustrates UV-VIS absorption spectra of pure ethylene glycol and a 5 molar solution of vanadium (IV) oxysulfate in ethylene glycol.
Figure 3:
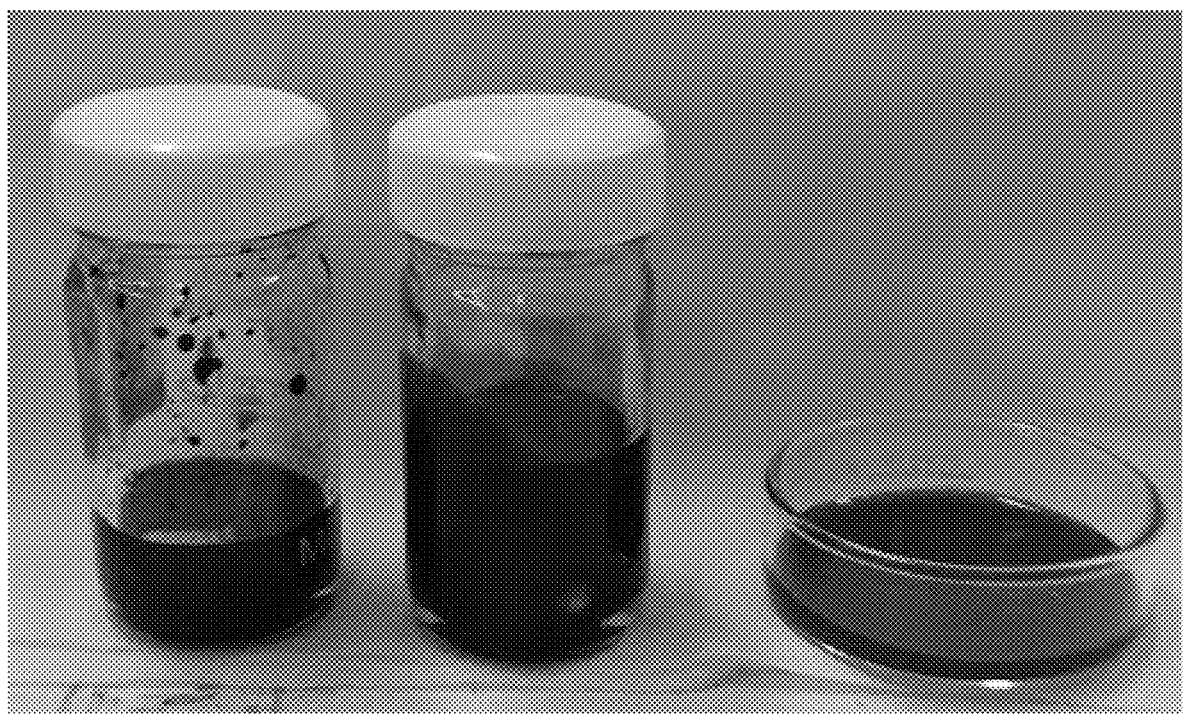
FIG. 3 illustrates concentrated vanadium (IV) oxysulfate in the ionic liquid $EMIHSO_4$. Shown is a sample that is 90% vanadium (IV) oxysulfate and 10% Titanium (IV) sulfate, which is in solution. Also illustrated is a polymer gel consisting of 15 wt % PVA, made from the vanadium (IV) oxysulfate/$EMIHSO_4$.
Figure 4:
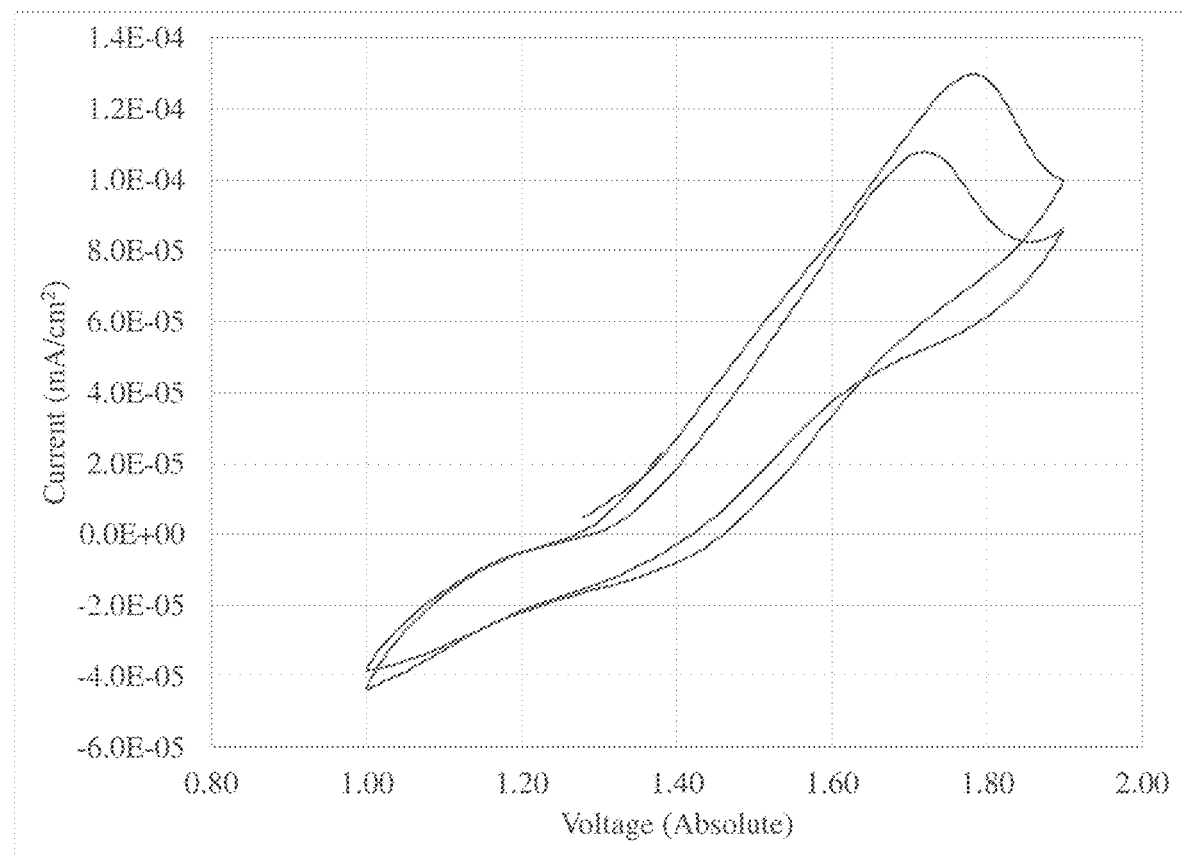
FIG. 4 illustrates a Cyclic voltammogram of a solid polymer PVA/$EMIHSO_4$/vanadium (IV) oxysulfate gel.

As shown in FIG. 4, not only can a concentrated solution of the metal salt vanadium (IV) oxysulfate be made, but the metal salt composition can be altered by adding different metal salts, such as titanium (IV) sulfate, which actually turns the solution green.

Figure 5:
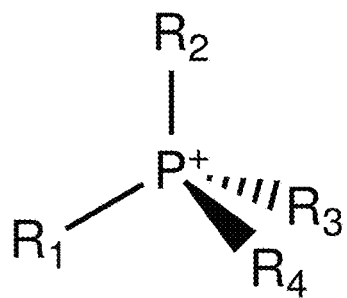
FIG. 5 illustrates general structures of alternate ionic liquid cations that can be used to make concentrated metal salt solutions.
Figure 5:
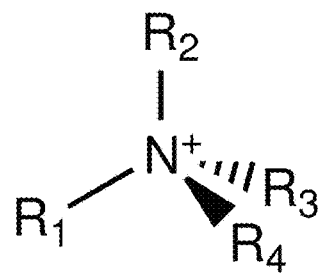
Figure 5:
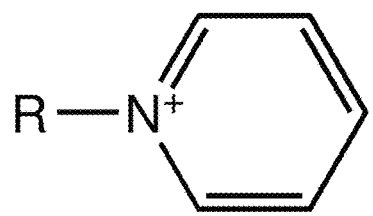
Figure 5:
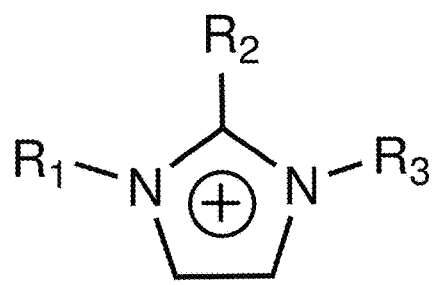
Figure 5:
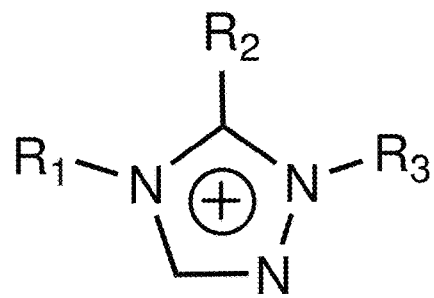
Figure 6:
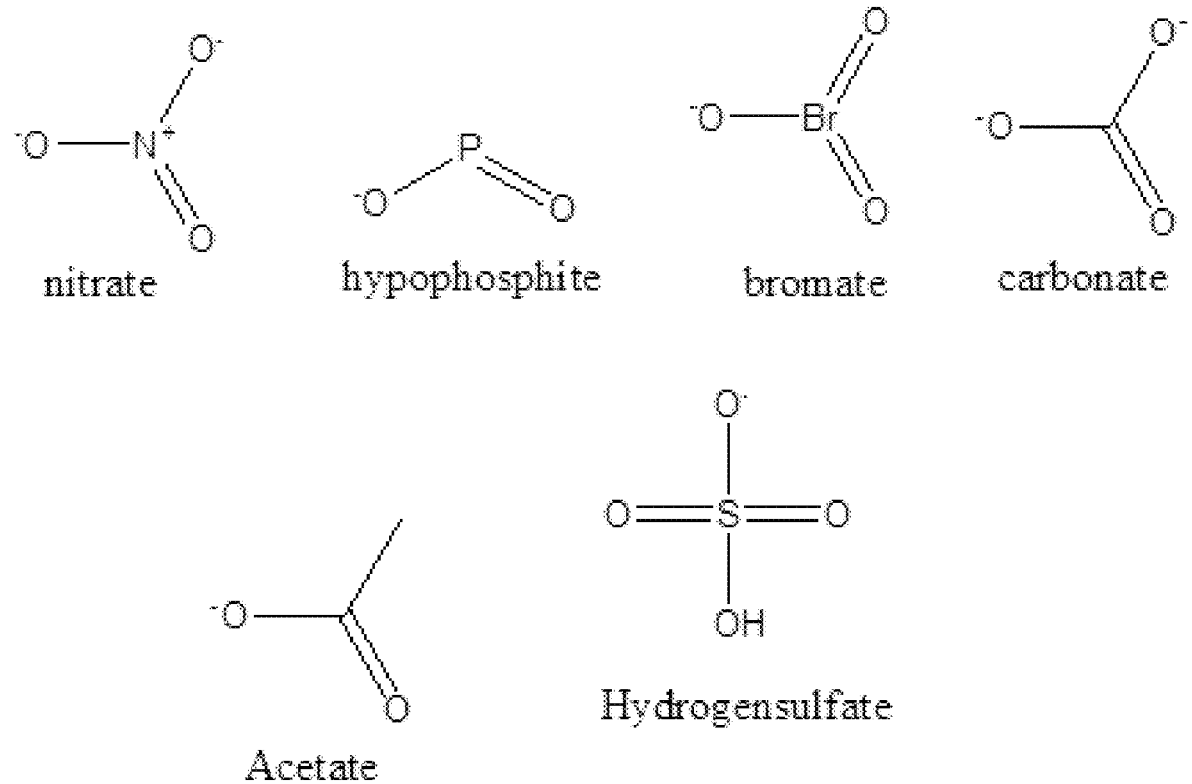
FIG. 6 illustrates general structures of alternate anions that can be used to make concentrated metal salt solutions.

Finally, in the original water solution, a water soluble polymer, such as polyvinyl alcohol can be added. This would give rise to a viscous polymer/metal salt solution that can then be converted to a solid polymer gel for electrochemical measurements, as shown in FIG. 5.

Example 4

This chemical technique allows for production of multiple types of concentrated metal salt solutions that would be applicable for multiple types of applications, from producing inks to prepare thin films of specific metals to new types of metal ion batteries, such as the infinitely rechargeable vanadium oxide battery. The ability to also combine it with a polymer to generate ionically conductive metal salt doped polymer gels has many different material and electrochemical applications.

This technique can be applicable to the general exfoliation of other layered materials to produce single or several atomically thick layers for other applications.

The above examples are merely illustrative of several possible embodiments of various aspects of the present disclosure, wherein equivalent alterations and/or modifications will occur to others skilled in the art upon reading and understanding this specification and the annexed drawings.

In addition, although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

I claim:

1. A concentrated solution of a metal salt in a non-aqueous solvent system made from the steps comprising:
    adding a water soluble polymer to a water solution;
    dissolving a metal salt in the water solution;
    wherein the metal salt comprises titanium (IV) sulfate;
    forming a dissolved metal salt solution;
    adding a non-aqueous solvent to the dissolved metal salt solution;
    forming a non-aqueous solvent system;
    flowing oxygen over the non-aqueous solvent system;
    heating the non-aqueous solvent system; and
    forming a concentrated solution of a metal salt in a non-aqueous solvent system.

2. The concentrated solution of a metal salt in a non-aqueous solvent system of claim 1 wherein the metal salt comprises vanadium (IV) oxysulfate.

3. The concentrated solution of a metal salt in a non-aqueous solvent system of claim 2 wherein the non-aqueous solvent comprises one selected from the group consisting of ethylene glycol, poly ethylene glycol, and an ionic liquid.

4. The concentrated solution of a metal salt in a non-aqueous solvent system of claim 3 further comprising the steps of forming a polymer/metal salt solution and then forming a solid polymer/metal salt gel; wherein the water soluble polymer comprises polyvinyl alcohol.

5. A method of making a concentrated solution of a metal salt in a non-aqueous solvent system, comprising:
    dissolving a metal salt in a water solution;
    wherein the metal salt comprises titanium (IV) sulfate;
    forming a dissolved metal salt solution;
    adding a non-aqueous solvent to the dissolved metal salt solution;
    forming a non-aqueous solvent system;
    flowing oxygen over the non-aqueous solvent system; and
    heating the non-aqueous solvent system.

* * * * *